(12) United States Patent
Thornton et al.

(10) Patent No.: US 11,527,975 B2
(45) Date of Patent: Dec. 13, 2022

(54) LOW-POWER BIAS SUPPLY TO FACILITATE THE LOW-RPM STARTUP OF THREE-PHASE AC AIRCRAFT GENERATORS

(71) Applicant: Hamilton Sundstrand Corporation, Charlotte, NC (US)

(72) Inventors: Christopher Derek Thornton, Saint Charles, IL (US); Adrian E. Vandergrift, Rockton, IL (US); Michael Congdon, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/194,681

(22) Filed: Mar. 8, 2021

(65) Prior Publication Data

US 2022/0286068 A1    Sep. 8, 2022

(51) Int. Cl.
*H02P 9/02* (2006.01)
*B64D 41/00* (2006.01)

(52) U.S. Cl.
CPC ............... *H02P 9/02* (2013.01); *B64D 41/00* (2013.01)

(58) Field of Classification Search
CPC .................................. H02P 9/02; B64D 41/00
See application file for complete search history.

(56) References Cited

U.S. PATENT DOCUMENTS

| | | | |
|---|---|---|---|
| 5,153,498 A | 10/1992 | Parro | |
| 6,674,274 B2 | 1/2004 | Hobrecht et al. | |
| 7,370,213 B2 | 5/2008 | Odaohhara | |
| 10,498,273 B2 | 12/2019 | Gao et al. | |
| 2010/0133813 A1* | 6/2010 | Cote | H02P 9/04 290/46 |
| 2012/0091716 A1 | 4/2012 | Cote et al. | |
| 2019/0352017 A1 | 11/2019 | Knope et al. | |

FOREIGN PATENT DOCUMENTS

GB    2510121 A  *  7/2014  ............... H02J 3/30

OTHER PUBLICATIONS

European Search Report for Application No. 22160878.9, dated Jul. 26, 2022, 10 pages.

* cited by examiner

*Primary Examiner* — Daniel Cavallari
(74) *Attorney, Agent, or Firm* — Cantor Colburn LLP (57) ABSTRACT

System and methods for providing power to a generator control circuit are provided. Aspects include a generator, a first power converter comprising a first input and a first output, the first input coupled to an output of the generator and the first output coupled to a valve circuit, a second power converter comprising a second input and a second output, the second input coupled to the output of the generator and the second output coupled to the valve circuit, and a controller configured to monitor a characteristic associated with the generator, cause the first power converter to provide power to the valve circuit when the characteristic of the generator is within a first range of characteristic values, and cause the second power converter to provide power to the valve circuit when the characteristic of the generator is within a second range of characteristic values.

20 Claims, 5 Drawing Sheets

LOW-POWER BIAS SUPPLY TO FACILITATE THE LOW-RPM STARTUP OF THREE-PHASE AC AIRCRAFT GENERATORS

BACKGROUND

The present invention generally relates to aircraft generators, and more specifically, to a low-power bias supply to facilitate the low RPM startup of three-phase alternating current (AC) aircraft generators.

Generators are often utilized in aircraft. A gas turbine engine on the aircraft provides a drive input into the generator shaft. The generator typically includes a disconnect shaft that can transmit mechanical power via a geared coupling. The geared coupling selectively drives a main generator to provide electric power for various uses on the aircraft.

It is desirable that the generated power be of a desired constant frequency. However, the speed from the input shaft will vary during operation of the gas turbine engine. This would result in variable frequency.

A constant speed drive (CSD) is a type of transmission that takes an input shaft rotating at a wide range of speeds, delivering this power to an output shaft that rotates at a constant speed, despite the varying input. They are used to drive mechanisms, typically electrical generators, that require a constant input speed. The CSD converts a variable speed input into a constant speed output, such that electric power of a desirable frequency is generated.

BRIEF DESCRIPTION

Embodiments of the present invention are directed to a power supply system for a generator control circuit. A non-limiting example of the system includes a generator, a first power converter comprising a first input and a first output, the first input coupled to an output of the generator and the first output coupled to a valve circuit, a second power converter comprising a second input and a second output, the second input coupled to the output of the generator and the second output coupled to the valve circuit, and a controller configured to monitor a characteristic associated with the generator, cause the first power converter to provide power to the valve circuit when the characteristic of the generator is within a first range of characteristic values, and cause the second power converter to provide power to the valve circuit when the characteristic of the generator is within a second range of characteristic values.

Embodiments of the present invention are directed to a method. A non-limiting example of the method includes providing a generator, providing a first power converter comprising a first input and a first output, the first input coupled to an output of the generator and the first output coupled to a valve circuit, providing a second power converter comprising a second input and a second output, the second input coupled to the output of the generator and the second output coupled to the valve circuit, monitoring, by a controller, a characteristic associated with the generator, causing, by the controller, the first power converter to provide power to the valve circuit when the characteristic of the generator is within a first range of characteristic values, and causing, by the controller, the second power converter to provide power to the valve circuit when the characteristic value of the generator being within a second range of characteristic values.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, in the interest of brevity, many conventional implementation details are only mentioned briefly herein or are omitted entirely without providing the well-known system and/or process details.

Figure 1:
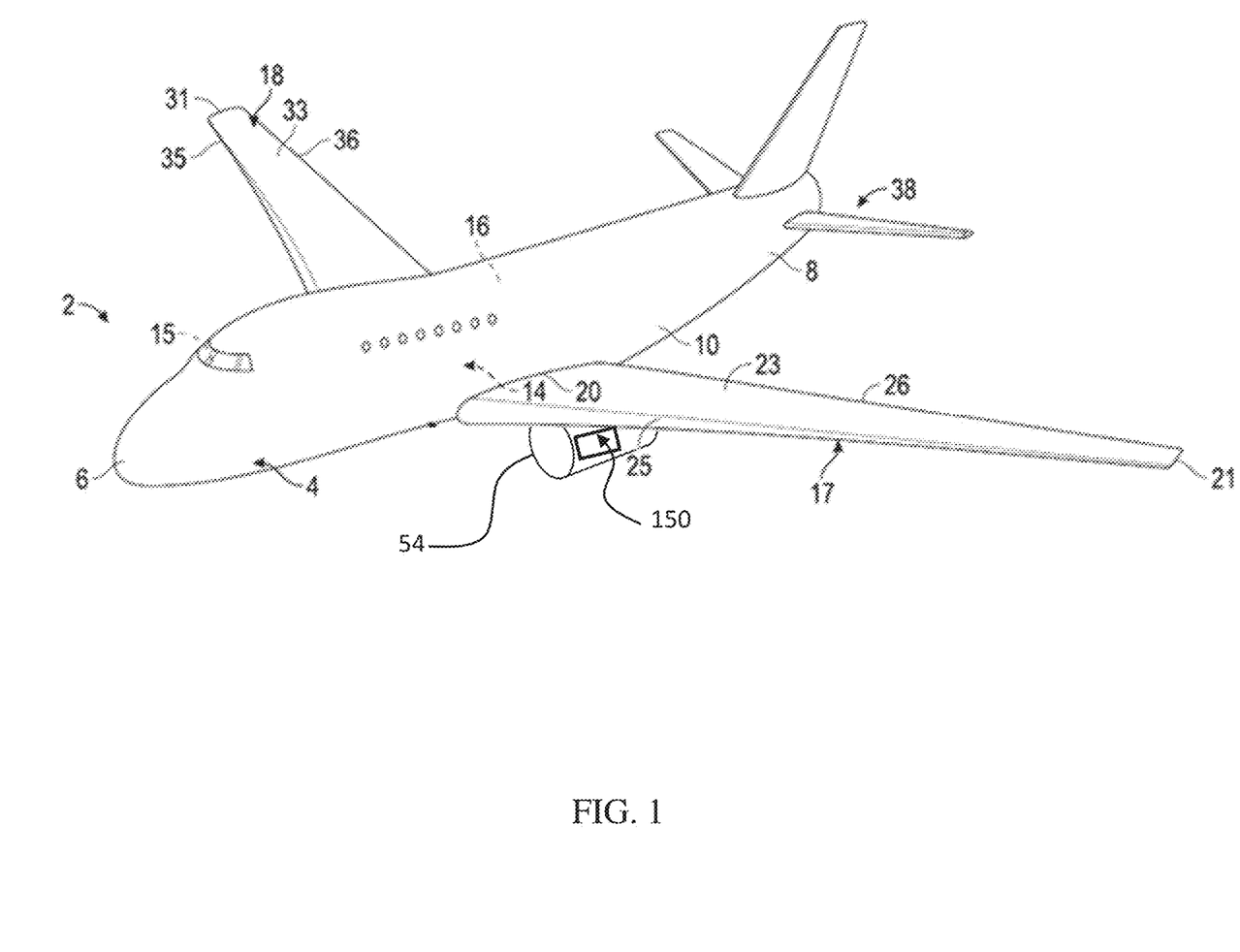
FIG. 1 is a perspective view of an aircraft that may incorporate embodiments of the present disclosure.

Referring now to the figures, a perspective view of an aircraft 2 that may incorporate various components of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger or cargo compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2.

Figure 2:
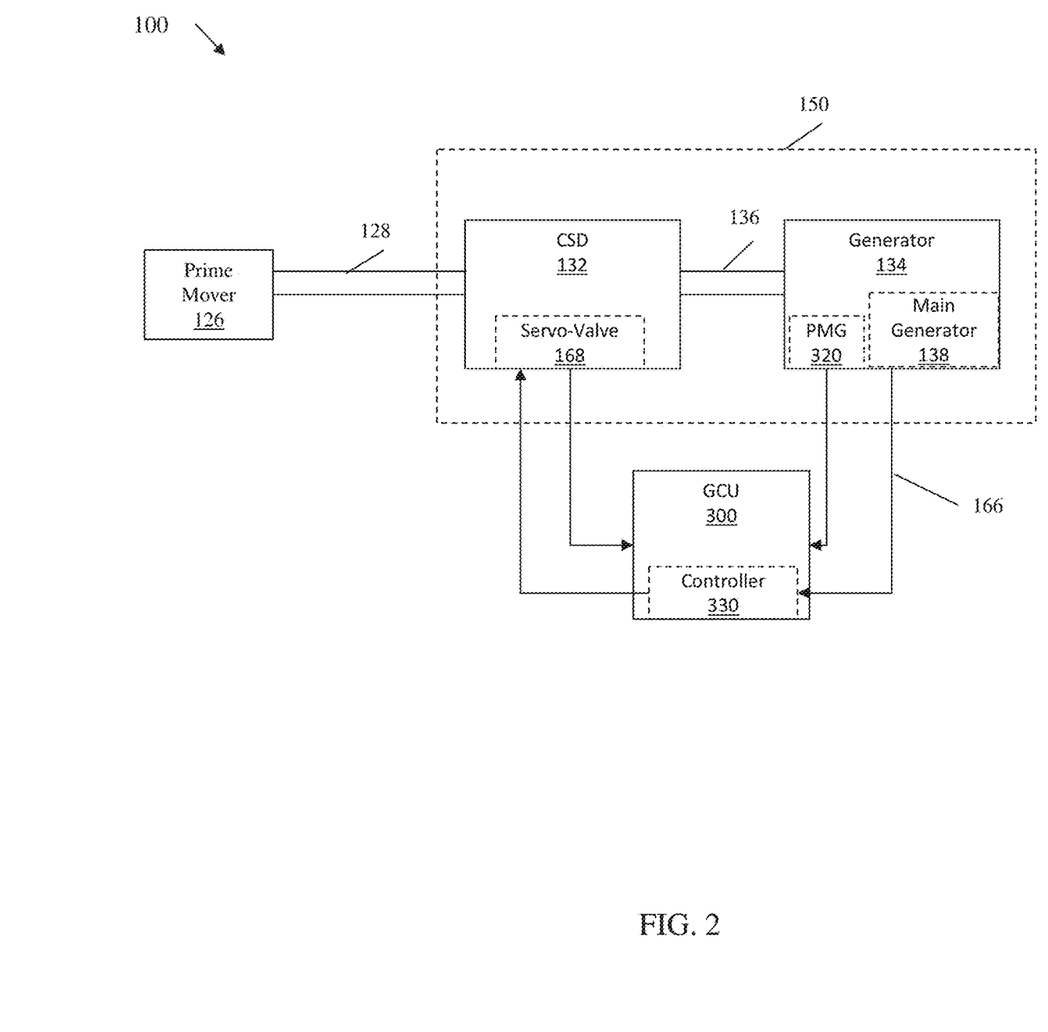
FIG. 2 depicts a block diagram representation of an aircraft electrical power generation system aircraft according to one or more embodiments.

Each engine 54 can have one or more generator and drive assemblies 150 having a generator 134 (described in greater detail in FIG. 2).

Turning now to an overview of technologies that are more specifically relevant to aspects of the disclosure, aircraft electrical power generating systems use one or more three-phase AC synchronous generators to provide electrical power. The voltage produced from the main output terminals of such generators is induced in the machine's stator coils by way of the combination in shaft speed and magnetic flux offered by the rotating rotor. The frequency of a synchronous generator's electrical output is directly dependent on the generator's shaft speed. The electrical frequency output from the generator is thus maintained by controlling the shaft speed of the generator within precise rpm limits.

The main sources of primary mechanical power for a generator (i.e., the prime mover or primary mover, referred to interchangeably) can be one of either the main aircraft engines, a special purpose gas-turbine, or wind turbine. The latter two sources are used for either auxiliary or emergency power. Irrespective of the source used, the shaft speed is subject to considerable speed variation. For generators that are required to provide a fixed-frequency output, a method of mechanical speed control is required to regulate the frequency to precise limits. Within the industry, a hydraulic system is a widely used method of controlling shaft speed, with respect to the varying speed of the prime mover (e.g., the shaft of the main aircraft engines or a shaft indirectly connected to the main aircraft engine, for example).

FIG. 2 depicts a block diagram representation of an aircraft electrical power generation system 100 aircraft according to one or more embodiments. The system 100 includes generator control unit (GCU) 300. The power generation system 100 can be utilized for providing power to aircraft loads. The system 100 also includes a constant speed drive (CSD) 132 and a generator 134. The generator 134 is a combination of a permanent magnet generator (PMG) 320 and the main generator 138. The CSD 132 receives mechanical input power from a shaft 128 attached to a prime mover 126 at varying speed and delivers mechanical power from the CSD's 132 output shaft 136 to the generator 134 at a constant speed. The generator 134 is driven by the shaft 136 and outputs electrical power through conversion of the mechanical energy of the generator shaft 136. In one or more embodiments, the CSD 132 and the generator 134 are combined in a single unit referred to as the integrated drive generator (IDG) 150 (FIG. 1 and FIG. 2).

With the CSD 132, the generator shaft 136 speed is controlled using a method of variable fluid displacement. The CSD 132 provides a method to vary shaft speed by effectively changing the speed ratio at which the generator shaft 136 rotates with respect to the shaft 128 of the prime mover 126. One method of speed control is by way of an electrical feedback circuit 166. By sensing the frequency of any of the generator's 134 electrical outputs, or the shaft 136 speed directly, the output of the circuit drives the coil of a hydraulic servo-valve 168. The action of the servo-valve 168 is to produce a variable fluid displacement in response to the magnitude of electrical current passed through its coil. When the system is active, current passed through the servo-valve coil causes the speed of the generator shaft 136 to increase to a higher ratio with respect to that of the prime mover 126 input. At low or zero coil current, the generator shaft defaults to the lowest speed ratio with respect to the input. Essentially the generator 134 has a gear shift that adjusts in response to the changing speed of the prime mover to keep the generator shaft 136 at essentially a constant speed.

A controller 330 is part of the generator control unit (GCU) 300. The GCU 300 controls both the generator frequency (via the shaft speed) and the magnitude of the main ac output voltage (voltage regulation). The GCU 300 is powered from the separate, unregulated three-phase AC source, known as a permanent magnet generator (PMG) 320. The PMG 320 voltage is induced in a separate set of stator coils by permanent magnets that are also mounted on the generator's rotor 136. The voltage produced by the PMG 320 is unregulated. Both its voltage and frequency are directly proportional to the generator's shaft 136 speed. Hence the voltage produced by the PMG 320 varies from zero to a relatively high magnitude at maximum shaft speed.

The wide voltage range over which the GCU 300 is required to operate represents a challenge for a GCU's 300 internal power supply system. Adding to this challenge is the problem that until the GCU 300 is powered, the hydraulic system that controls the generator-to-input shaft speed ratio, defaults to the minimum. It is only after the GCU 300 has powered up, and the controller 330 is active, can the CSD 132 be actively controlled to increase the generator's shaft 136 speed higher by adjustment of the CSD's 132 shaft-speed ratio. Unfortunately given the limited input voltage range of most internal power supply circuits, by the time the GCU 300 is powered and able to pick up the speed of the generator shaft 136, the prime mover 126 is already above the minimum input speed at which the generator 134 is required to provide regulated output voltage and frequency.

Most switched-mode power supply circuit topologies can comfortably operate over an input-voltage range of 3:1. However, in order to provide power to the speed control circuit at a relatively low input voltage, and accommodate ample margin at the highest operating voltage, an operating range approaching 5:1 is desired.

Figure 3:
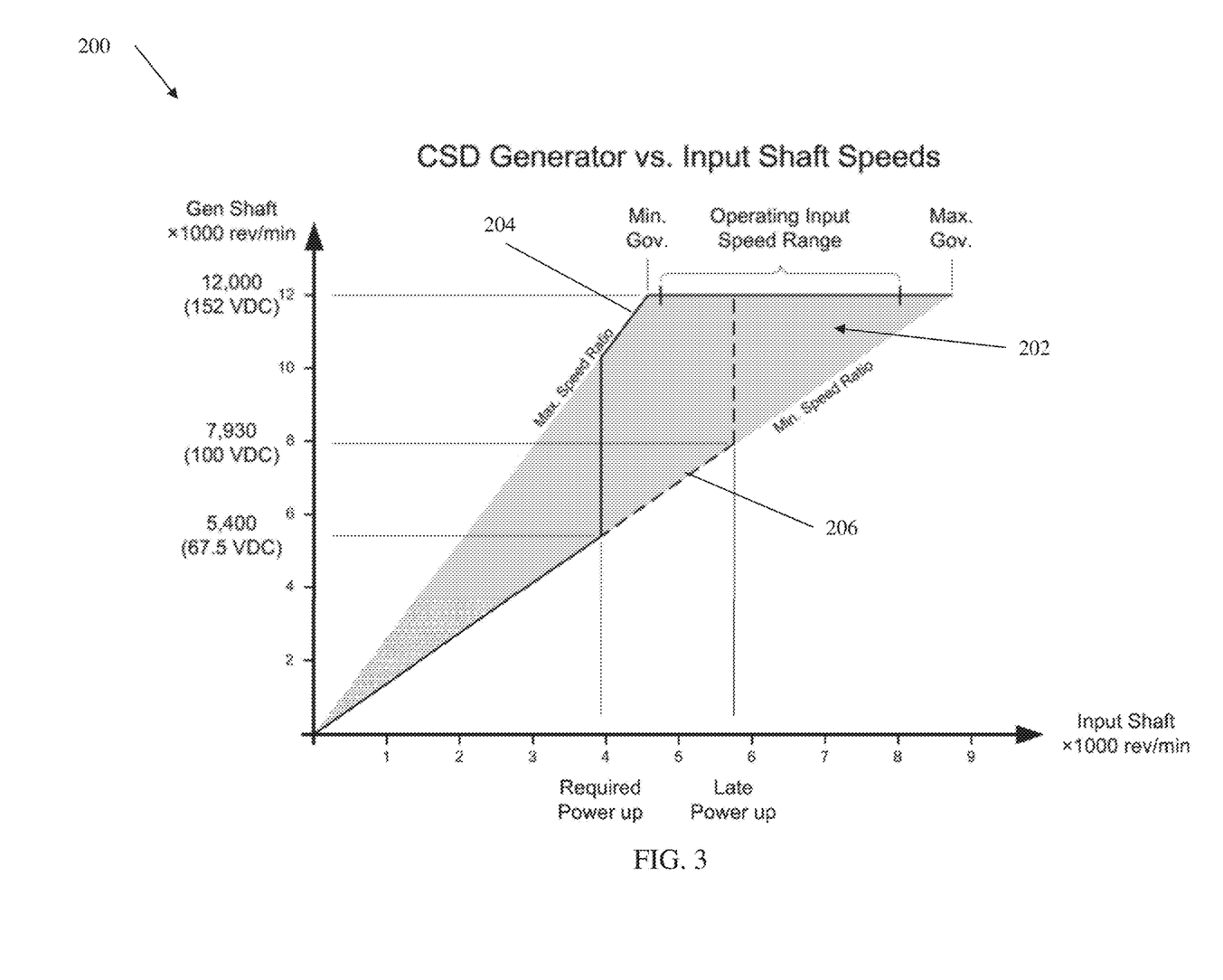
FIG. 3 depicts a graph illustrating the relationship between input shaft speed and generator shaft speed for a constant speed drive according to one or more embodiments.

FIG. 3 depicts a graph 200 illustrating the relationship between input shaft speed (related to the engine shaft) and generator shaft speed for a constant speed drive according to one or more embodiments. The shaded portion 202 indicates the limits of the minimum and maximum input-to-generator shaft-speed ratios. The generator shaft speed relates directly to a direct current (DC) input to the GCU's internal power supply system. The DC voltage is derived from the rectification of the three-phase AC PMG source which progressively rises from zero as the rotational speed of the generator shaft is increased. The solid line 204 of the graph 200 represents a desired start-up characteristic for the generator. In this example, the GCU and the speed-control circuit are powered at a generator shaft speed of 5,400 rev/min, equivalent to a DC input voltage to the GCU of 67.5 VDC. Once powered, the speed-control circuit can provide the necessary stimulus to the servo-valve coil to ensure the rapid adjustment of the CSD shaft-speed ratio from minimum to maximum. This allows the speed-control system to achieve the steady-state control of the generator shaft at the required speed of 12,000 rev/min, which is prior to the input shaft reaching the minimum governing speed of the CSD. The dashed line 206 of the graph 200 shows the effect of the GCU not being powered until a higher generator rpm of 7,930 rev/min is reached. This correlates to the GCU's internal power supply system not starting until the DC voltage (derived from the PMG three-phase AC source) has reached 100 VDC. As a result, the rapid adjustment in the speed of the generator shaft is not achieved early enough, requiring the input shaft to reach a rotational speed significantly higher than the minimum governing speed before the GCU can both raise and control the generator shaft speed at 12,000 rev/min. This requires that the input shaft speed be raised well above the minimum operating requirement before the generator's electrical output can be made available to the aircraft.

To address the issue described above, one or more embodiments introduce a low-power bias power supply to the GCU that is separate from the GCU's main internal power supply. The low-power bias supply is designed to provide power at a much lower PMG voltage and rpm as illustrated in FIG. 3. In one or more embodiments, the amount of power can be limited to that required to provide current to a servo-valve coil and during the period before the main power supply becomes active. The stimulus can be made directly to the servo-valve coil or by powering a servo-valve drive circuit which can be configured to pass current to the servo-valve coil. Performing this operation of the servo-valve coil occurs when the GCU is unable to control the servo-valve coil due to the unavailability of power due to the delayed start-up of the main power supply.

As mentioned above, the low power bias supply can deliver power directly to the servo-valve coil or to the servo-valve drive circuit. The goal for each is to cause the hydraulic system to begin increasing the speed ratio of the CSD's generator shaft with respect to that of the prime mover. This has the effect of accelerating the generator shaft speed to a higher rpm which in turn further increases the PMG voltage. Any increase in the PMG voltage can further raise the magnitude of current passed to the servo-valve coil. This creates a condition of positive feedback that can result in a progressively more rapid acceleration of the generator input shaft. Any increase in generator shaft speed also increases the PMG voltage and correspondingly the DC voltage that supplies the GCU. At some point, the GCU's main internal power supply becomes active allowing the GCU to assume the normal control of both the generator shaft speed and voltage regulation. This is achieved before the input shaft speed reaches the minimum governing speed of the CSD. This enables a "boot-up" process that is initiated earlier and at a lower rpm so that the generator can be ready to supply the aircraft electrical system with the specified AC voltage and frequency at the minimum required operating shaft speed of the prime mover.

Figure 4:
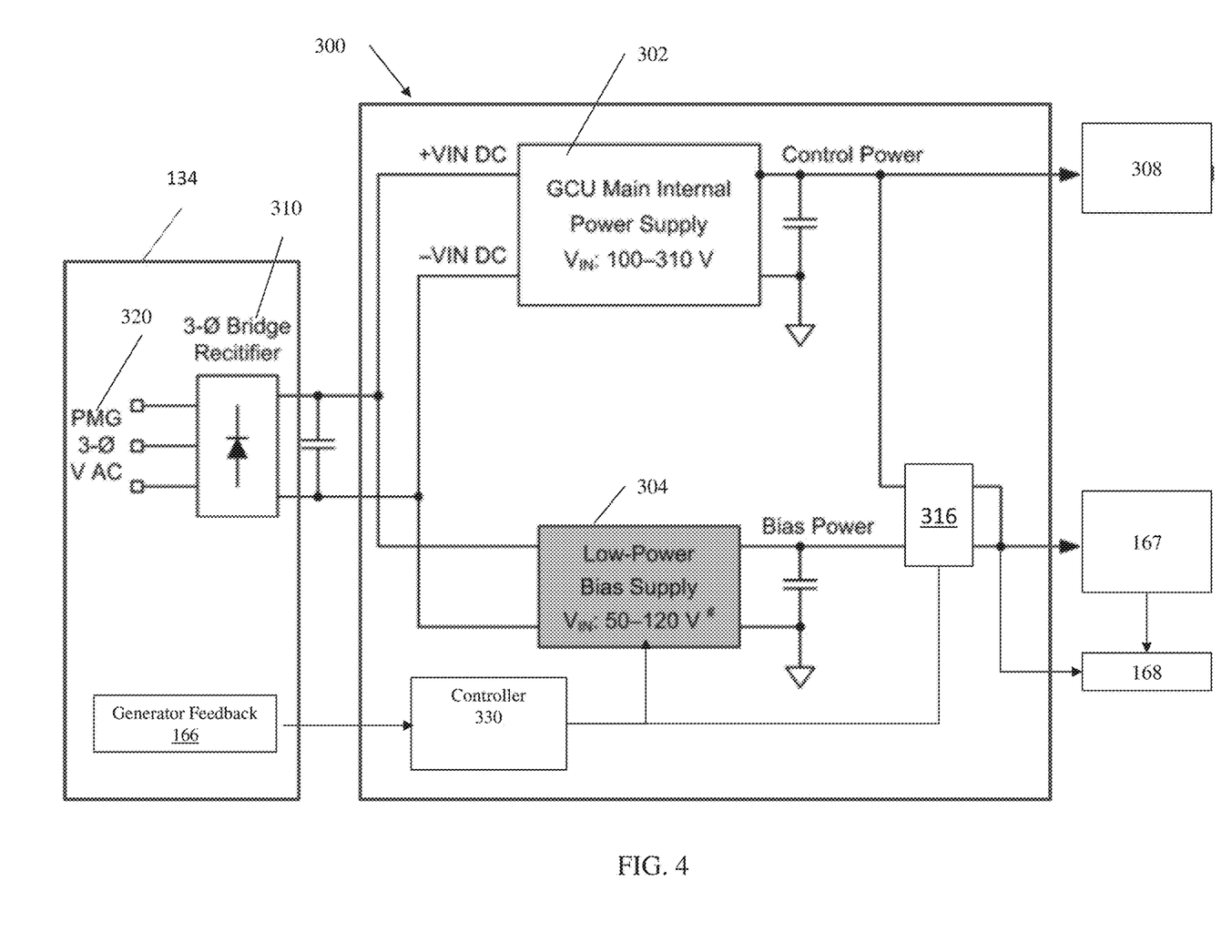
FIG. 4 depicts a block diagram of a GCU internal power system according to one or more embodiments.

FIG. 4 depicts a block diagram of a GCU internal power system according to one or more embodiments. The GCU internal power system 300 includes a GCU main internal power supply 302 and a low-power bias supply 304. The low-power bias supply 304 can provide enough voltage and current to the servo-valve 168 or to a servo-valve drive circuit 167 that drives the servo-valve 168 so it can deliver the magnitude of current needed to begin increasing the shaft-speed ratio of the CSD 132. The low-power bias supply 304 can supply power for a short period of time prior to the GCU's main internal power supply 302 becoming active. Once active, the GCU's main internal power supply 302 can then supply power to the servo-valve 168 or drive circuit 167. When the GCU's main internal power supply 302 is active, the lower-power bias supply 304 can be disabled or turned off.

Referring back to the example of FIG. 3, the operating input speed range for the input shaft to operate the generators is between 4,600 rpm and 8,000 rpm shown as the "Operating Input Speed Range" on the graph 200. However, without a low-power bias supply as described herein, the GCU can only start operation when receiving at least 100 VDC from the PMG which occurs between 5,000 and 6,000 rpm from the input shaft which is shown as the dotted-line 206 in graph 200. However, with the low-power bias supply, the servo-valve coils or drive circuitry can be operated now at 67.5 VDC which can occur at 4000 rpm for the input shaft. During start up, this allows for earlier stimulus of the CSD, such that the generator is able to reach its operating speed earlier and at a lower input speed as shown in graph 200 outlined by the solid line 204. In one or more embodiments, the generator shaft speed, input shaft speed, and operational input range described herein in FIG. 3 are included for exemplary purposes. Depending on the aircraft and power generation system, the ranges of the input voltage, rpm and frequency, that the low power bias 304 and GCU main 302 power converters are active can be different. These values may also overlap such that the low-power bias converter 304 may continue to operate at input voltages above that in which the GCU main power converter 302 becomes active. This overlap can be designed to ensure the continued and uninterrupted stimulus of the servo-valve throughout the boot-up (IDG spin up) period. With a variety of system input voltage, rpm, and frequency ranges, the present system 300 ensures that the low-power bias converter 304 powers up at a lower voltage and rpm than the GCU main power converter 302, and at a sufficiently low voltage to ensure the timely "boot up" of the system. The goal is for the GCU, as a whole to power up and gain control of the main generator by the time the prime mover (engine) has reached minimum idling speed. This is in terms of the main generator 138 providing power to the aircraft, at the specified output voltage and frequency.

In one or more embodiments, the internal power system 300 is driven by electrical power coming from the PMG 320 which is attached to the same generator shaft 136 (from FIG. 2) as the main generator 138 (from FIG. 2). As mentioned above, the PMG 320 is unregulated and the voltage and frequency are directly proportional to the generator's shaft 136 speed. The PMG 320 produces an AC voltage which is then rectified to DC by a rectifier circuit 310. The two power sources (302, 304) are power converters (DC-to-DC converters) and supply power to the servo-valve coil 168 or drive circuit 167. The main internal power supply 302 supplies power to the GCU control circuits 308 as well. The two sources (302, 304), in some embodiments, can be connected through current flow control devices 316 (e.g., a pair of semiconductor diodes, a pair of actively controlled solid-state switches, relay contact, or any other circuit topology) operated by the controller 330 that is receiving feedback from the generator through a feedback line/circuit 166. The generator feedback 166 can include the output voltage or frequency of the PMG 320, the generator 134 (from FIG. 2) shaft speed, the generator 134 (from FIG. 2) frequency, and/or any combination of these characteristics associated with the generator 134 (from FIG. 2).

In one or more embodiments, the two power supplies (302, 304) are power converters. The output voltage from the PMG source 320 is unregulated and varies significantly with the generator's shaft speed. During power up ("boot-up"), as the generator shaft begins moving responsive to movement by the primary mover, the PMG source 320 provides increasing voltage which is then rectified by the rectifier 310. The low-power bias supply 304 can operate over a lower input voltage range of the PMG 320; 50-120 V in this example. During this time, the low-power supply 304 can provide power to the servo-valve 168 or servo-valve drive circuit 167 through operation of the current flow control devices 316 which are operated by the controller 330. Operation of the GCU main internal power supply 302 is over a higher input voltage range from the PMG 320; 100-310 V in this example. During this time, the GCU main internal power supply 302 can provide power to the servo-valve 168 or servo-valve drive circuit 167 along with the GCU control circuits 308. The operation of the servo-valve/ drive circuit 168 by the main internal power supply 302 is similarly controlled by the controller 330 operating the current flow control devices 316. The controller 330 can receive feedback from the generator 134 (from FIG. 2) to determine when to switch from causing the low-power bias supply 304 to supply power to the servo-valve 168 or drive circuit 167 to the main internal power supply 302 supplying power to the servo-valve 168 or drive circuit 167 in the CSD 132 (from FIG. 2). The low-power bias supply 304 can be disconnected by the current flow control devices 316 or simply turned off by the controller 330. In one or more embodiments, the low-power bias supply 304 can be any type of power converter including, but not limited to, a flyback converter. In one or more embodiments, the use of the term "flyback" is to include any suitable power converter topology, regulated or unregulated, that can provide power at input voltages below the minimum operating input voltage of the main converter 302. In one or more embodiments, as the input voltage ranges of the low power bias converter 304 and GCU main converter 302 may overlap, it is the control of the switches 316 that determines which converter (302 or 304) provides the stimulus to the servo-valve coil 168 or drive circuit 167. In some embodiments, the two switches 316 may also operate differently. A first switch in the voltage control devices 316 that provides early stimulus during the spool-up period can be applied statically. This first switch has the purpose of initiating transition of the CSD speed ratio. There is no speed control associated with this first switch. The stimulus is essentially applied open loop. A second switch in the voltage control devices 316 incorporates (or allows for) pulse width modulation (PWM) control. This second switch has the ability to regulate the current to the servo-valve 168 in order to control the speed of the generator shaft 136. The control to the servo-valve 168 is to adjust the speed ratio of the CSD up and down to precisely regulate the generator shaft speed to a fixed rpm, over the full operating speed range of the input shaft and prime mover.

In one or more embodiments, the controller 330 can perform functions such as monitoring voltage output from the PMG 320, shaft speed of the generator 134 and/or prime mover 126, bias power supply voltage output, GCU main internal power supply output, operate one or more current flow control devices 316 and/or other types of circuitry within the system 300, and the like. In one or more embodiments, the controller 330 can monitor the shaft speed of the generator, the output voltage of the PMG 320, or a combination of both to determine when to disconnect, using the current flow control devices 316, the low-power bias supply 304 from the servo-valve or servo-valve drive circuit 168 and connect the GCU main internal power supply 302 to said servo-valve or servo-valve drive circuit 168. This can be performed at a specified output frequency or voltage from the PMG and/or a specified shaft speed of the generator.

In one or more embodiments, the controller 330 or any of the hardware referenced in the system 300 can be implemented by executable instructions and/or hardware circuitry that could also include a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form. In one or more embodiments, the controller 330 can be control circuitry implemented by a combination of logic gates and/or other components utilized to operate the current flow control device 316. The combination of logic gates can include, but are not limited to, an overcharge comparator with a reference voltage that drives a configuration of logic gates that operate the current flow control device 316 and/or any other component, for example.

Figure 5:
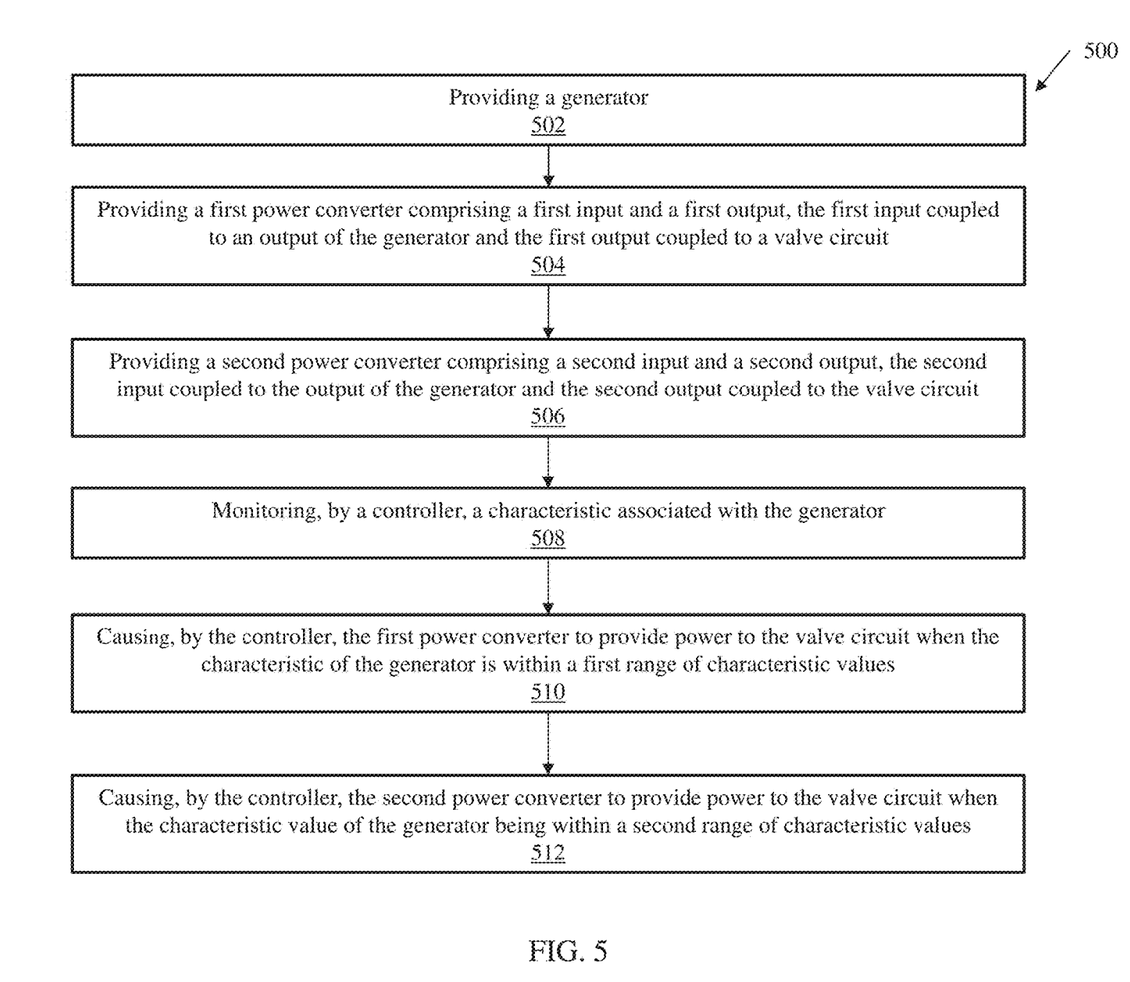
FIG. 5 depicts a flow diagram of a method for providing power to a generator control circuit according to one or more embodiments.

FIG. 5 depicts a flow diagram of a method for providing power to a generator control circuit according to one or more embodiments. The method 500 includes providing a generator as shown in block 502. In some embodiments, the generator is a permanent magnet generator which is unregulated and the power supplied from this generator is based on the generator shaft speed associated with a prime mover such as an aircraft main engine or a shaft indirectly connected to the aircraft engine. In some embodiments, the prime mover can include, but is not limited to, a gas turbine often used in an auxiliary power unit and a wind turbine that is a source of emergency power. At block 504, the method 500 includes providing a first power converter comprising a first input and a first output, the first input coupled to an output of the generator and the first output coupled to a valve circuit. In some embodiments, the first power converter is the low-power bias power supply 304 (from FIG. 4) which is coupled to the servo-valve or servo-valve drive circuit 168. At block 506, the method 500 includes providing a second power converter comprising a second input and a second output, the second input coupled to the output of the generator and the second output coupled to the valve circuit. In some embodiments, the second power convertor is the GCU main internal power supply 302 (from FIG. 4) which is coupled to both the GCU control circuits 308 and the servo valve or servo-valve drive circuit 168. The method 500, at block 508, includes monitoring, by a controller 330 or control circuitry, a characteristic associated with the generator. Herein, the controller 330 can monitor the output voltage of the generator and/or the generator shaft speed. The method 500 then includes causing, by the controller, the first power converter to provide power to the valve circuit when the characteristic of the generator is within a first range of characteristic values, as shown at block 510. And at block 512, the method 500 includes causing, by the controller, the second power converter to provide power to the valve circuit responsive to the characteristic value of the generator being within a second range of characteristic values. The range of characteristic values can be tied to either the generator shaft speed and/or the output voltage, and frequency of the generator (e.g., PMG 320). The low-power bias supply provides power to the servo-valves during the "boot-up" period where the generator shaft speed is low and thus the output voltage is low. The low-power bias supply is able to power the servo-valve or servo-valve drive circuit during this boot-up period before having the controller switch off or disconnect this low-power bias supply when the GCU main power supply has sufficient voltage to operate after this boot-up period.

Additional processes may also be included. It should be understood that the processes depicted in FIG. 5 represent illustrations, and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power supply for a generator control circuit comprising:
   a generator;
   a low-power bias supply comprising a first input and a first output, the first input coupled to an output of the generator and the first output coupled to a valve circuit;
   a generator control unit (GCU) main internal power supply comprising a second input and a second output, the second input coupled to the output of the generator and the second output coupled to the valve circuit; and
   a controller configured to:
      monitor a characteristic associated with the generator;
      cause the low-power bias supply to provide power to the valve circuit when the characteristic of the generator is within a first range of characteristic values; and
      cause the GCU main internal power supply to provide power to the valve circuit when the characteristic of the generator is within a second range of characteristic values.

2. The power supply of claim 1, wherein the first range of characteristic values is lower than the second range of characteristic values.

3. The power supply of claim 1, wherein the first range of characteristic values overlaps with the second range of characteristic values.

4. The power supply of claim 1, wherein the first range of characteristic values does not overlap with the second range of characteristic values.

5. The power supply of claim 1, wherein the valve circuit comprises a servo-valve or servo-valve drive circuit.

6. The power supply of claim 1, wherein the second output is further coupled to a GCU control circuit.

7. The power supply of claim 1, wherein providing power to the valve circuit by the low-power bias supply responsive to a characteristic value of the generator being within a first range of characteristic values comprises:
   operating one or more switches coupled between the first output and the valve circuit to allow for power to be supplied to the valve circuit from the low-power bias supply.

8. The power supply of claim 1, wherein providing power to the valve circuit by the second power converter responsive to the characteristic value of the generator being within the second range of characteristic values comprises:
   operating one or more switches coupled between the second output and the valve circuit to allow for power to be supplied to the valve circuit from GCU main internal power supply.

9. The power supply of claim 1, wherein the generator comprises a permanent magnet generator.

10. The power supply of claim 1, wherein the low-power bias supply comprises a low-power converter.

11. The power supply of claim 1, wherein the characteristic associated with the generator comprises an output voltage.

12. The power supply of claim 1, wherein the characteristic associated with the generator comprises a generator shaft speed.

13. The power supply of claim 1, wherein the characteristic associated with the generator comprises a frequency of the generator.

14. A method comprising:

providing a generator;

providing a low-power bias supply comprising a first input and a first output, the first input coupled to an output of the generator and the first output coupled to a valve circuit;

providing a generator control circuit (GCU) main internal power supply comprising a second input and a second output, the second input coupled to the output of the generator and the second output coupled to the valve circuit;

monitoring, by a controller, a characteristic associated with the generator;

causing, by the controller, the low-power bias supply to provide power to the valve circuit when the characteristic of the generator is within a first range of characteristic values; and causing, by the controller, the GCU main internal power supply to provide power to the valve circuit when the characteristic value of the generator being within a second range of characteristic values.

15. The method of claim 14, wherein the first range of characteristic values is lower than the second range of characteristic values.

16. The method of claim 14, wherein the first range of characteristic values overlaps with the second range of characteristic values.

17. The method of claim 14, wherein the valve circuit comprises a servo-valve or servo-valve drive circuit.

18. The method of claim 14, wherein the second output is further coupled to a GCU control circuit.

19. The method of claim 14, wherein providing power to the valve circuit by the low-power bias supply responsive to a characteristic value of the generator being within a first range of characteristic values comprises:

operating one or more switches coupled between the first output and the valve circuit to allow for power to be supplied to the valve circuit from the low-power bias supply.

20. The method of claim 14, wherein providing power to the valve circuit by the GCU main internal power supply responsive to the characteristic value of the generator being within the second range of characteristic values comprises:

operating one or more switches coupled between the second output and the valve circuit to allow for power to be supplied to the valve circuit from the GCU main internal power supply.

\* \* \* \* \*